UNITED STATES PATENT OFFICE.

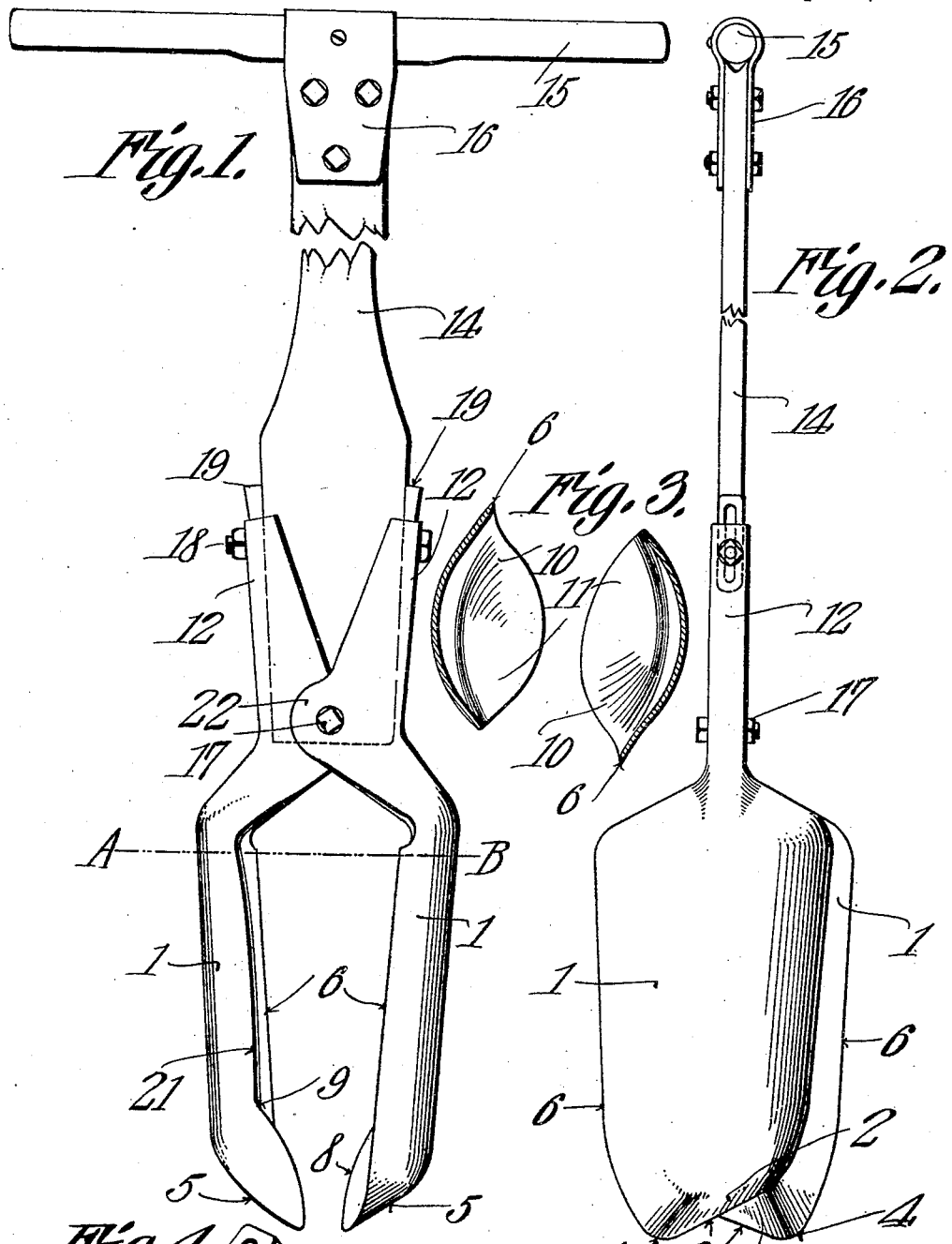

GEORGE M. FENN, OF CHARLOTTE, MICHIGAN.

POST-HOLE AUGER.

935,251.                    Specification of Letters Patent.    Patented Sept. 28, 1909.

Application filed June 19, 1909.   Serial No. 503,211.

*To all whom it may concern:*

Be it known that I, GEORGE M. FENN, a citizen of the United States, residing at Charlotte, in the county of Eaton and State of Michigan, have invented a new and useful Post-Hole Auger, of which the following is a specification.

The objects of the invention are, generally, the provision, in a merchantable form, of a device of the class above mentioned, which shall be inexpensive to manufacture, facile in operation, and devoid of complicated parts; specifically, the provision of an auger, including cutting blades of novel and improved form; of novel means for assembling the said blades with a shank by which they are rotated; and of novel means for adjusting the said blades; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings:—Figure 1 shows the invention in side elevation; Fig. 2 is a side elevation of the device, showing the same at right angles to the position delineated in Fig. 1. Fig. 3 is a transverse section taken on the line A—B, the section being applicable equally, to Fig. 1 or Fig. 2; Fig. 4 is a detail perspective of the wedge-shaped loop whereby the blades are adjusted.

In carrying out my invention, I provide, primarily, a pair of blades which are denoted by the numeral 1. These blades are trough-shaped, and convexed oppositely from each other. The lower ends of the trough are closed by terminal walls 2. These terminal walls 2 are not disposed in planes normal to the axis of the device, but, as shown in Fig. 2, and denoted by the numeral 3, are upwardly inclined toward opposite sides of the device, to fashion, at the extremities of the blades, non-alining, depending tips 4. The terminal walls 2 of the blades 1 are upwardly inclined in their longer dimension, toward opposite sides of the device as hereinbefore pointed out, and, in addition to the aforementioned upward inclination, the walls slope downwardly toward each other, as denoted by the numeral 5 in Fig. 1.

The blades 1 are so constructed that their upright cutting edges 6 are disposed in non-alining relation whereby the said blades may readily engage and cut away the soil at the sides of the post-hole, the tips 4 being positioned adjacent these upright cutting edges 6. The cutting edges 6 extend downward and laterally, to present cutting edges 8 along the adjacent extremities of the terminal walls 2, these cutting edges 8 terminating at 9, the point where the terminal walls 2 unite, somewhat abruptly, with the blunt edge 21 of the blade. By referring to Fig. 3, and to Fig. 2, it will be seen that the terminal wall 2 unites by a somewhat abrupt curve with the wall forming the cutting edge 6, as denoted by the numeral 10, thence rising, by a gradual slope, to the opposite side of the blade, as denoted by the numeral 11. The inclination denoted by the numeral 3 causes the terminal walls 2 of the blades to enter the soil readily, and to cause the device to work its way rapidly thereinto, the soil, as it is loosened by the tip 4, traveling upward along the inclined portion 3. The terminal walls 2 likewise serve to prevent the soil from dropping from the grip of the device, when the same is drawn upward out of the post-hole.

The upper extremities of the blades 1 are flexed toward each other to form arms 12, provided with overlapping ears, a retaining member 17 being passed transversely through the ears and through the lower extremity of a shank 14 which is introduced between the arms 12, the member 17 forming a pivotal union between the blades and the shank. The shank 14 may be surmounted by a transverse handle 15, assembled with the shank by means of a clip 16, or in any other suitable manner. A retaining member 18, in the present instance shown in the form of a bolt, is passed transversely through the upper extremities of the arms 12 and through the portion of the shank 14, which is between them, the said bolt being provided with a nut to engage one of the arms 12, the bolt and nut constituting a clamping means for holding the blades in position. Disposed between the upper extremities of the arms 12 and the shank 14 are adjusting blocks 19, which, in the present instance, take the form of a wedge-shaped loop, denoted by the numeral 20, and illustrated most clearly in Fig. 4. Through these loops 20 the retaining member 18 is passed, and it is obvious that, by loosening the nut which is carried by the retaining member, the members 20 may be adjusted vertically, to space the lower extremities of the blades 1 apart, to accommodate soils of different tenacities, and to regulate the cutting effect of the blades when the same are rotated.

Having thus described my invention, what I claim as new, and desire to protect, by Letters Patent, is:—

1. A device of the class described comprising a shank; coöperating blades pivoted intermediate their ends to the shank; and adjusting blocks arranged to be inserted between the upper extremities of the blades and the shank, the blades being bent to inclose the blocks transversely.

2. A device of the class described comprising a shank; coöperating blades pivoted intermediate their ends to the shank; and wedges arranged to be inserted upon the exterior of the shank between the upper ends of the blades and the shank, the blades being bent to inclose the wedges.

3. A device of the class described comprising a shank; coöperating blades pivoted intermediate their ends upon the shank; a retaining member extending transversely through the shank and the upper ends of the blades; and wedge-shaped loops to inclose the retaining member and to slide longitudinally thereon, the said loops being disposed between the upper extremities of the blades and the shank.

4. A device of the class described comprising a shank; coöperating blades pivoted intermediate their ends upon the shank; separately manipulable wedge-shaped loops interposed between the upper extremities of the blades and the shank; and clamping means mounted in the blades and in the shank upon which the loops are arranged to slide.

5. A device of the class described comprising a shank; coöperating blades pivoted intermediate their ends upon the shank; a clamping member extending through the upper extremities of the blades and the shank; and slotted wedges slidably mounted upon the clamping member between the blades and the shank.

6. A device of the class described comprising a shank; coöperating blades pivoted intermediate their ends upon the shank; a clamping member extending through the upper extremities of the blades and the shank; and slotted wedges slidably mounted upon the clamping member between the blades and the shank, the wedges being depressible to move the lower extremities of the blades toward each other.

In testimony that I claim the foregoing as my own, I have hereto affixed my signature in the presence of two witnesses.

GEORGE M. FENN.

Witnesses:
H. K. JENNINGS,
ESTELLA S. KLAISS.